United States Patent [19]

Stropkay

[11] 3,939,316

[45] Feb. 17, 1976

[54] PANIC STOPLIGHT SYSTEM FOR AUTOMOBILES USING A FLUID PRESSURE SWITCHING DEVICE

[76] Inventor: Edward J. Stropkay, 11348 Spruce Drive, Chesterland, Ohio 44026

[22] Filed: Oct. 19, 1973

[21] Appl. No.: 407,822

[52] U.S. Cl.............. 200/82 D; 340/242; 200/83 J; 340/52 C
[51] Int. Cl.².......................... H01H 35/38
[58] Field of Search ....... 137/557; 92/96; 340/52 R, 340/52 C, 62, 71, 262; 200/81 R, 82 D, 153 W, 83 J, 83 N, 83 T, 83 W, 83 C

[56] References Cited
UNITED STATES PATENTS

| | | | |
|---|---|---|---|
| 2,520,353 | 8/1950 | Yanez et al. | 200/58 |
| 2,564,133 | 8/1951 | Stadler | 200/153 W |
| 2,749,536 | 6/1956 | Sperling | 340/242 |
| 3,329,936 | 7/1967 | Nallinger | 340/71 |
| 3,417,215 | 12/1968 | Corona | 200/83 T |
| 3,448,434 | 6/1969 | Nolte, Jr. | 340/262 |
| 3,459,954 | 8/1969 | Vgorbani | 200/82 D |
| 3,461,425 | 8/1969 | Schultz | 200/82 D |

*Primary Examiner*—Gerald P. Tolin
*Attorney, Agent, or Firm*—Donnelly, Maky, Renner & Otto

[57] ABSTRACT

A panic stoplight system for automobiles includes a fluid pressure switching device connected through a flasher with signal lights for operation by the automobile braking system. The fluid pressure switching device closes for flashing the signal lights only when the force applied to the actuator of the braking system is representative of panic braking. Time delay means keeps the system energized for a predetermined time after panic braking ceases.

3 Claims, 4 Drawing Figures

PANIC STOPLIGHT SYSTEM FOR AUTOMOBILES USING A FLUID PRESSURE SWITCHING DEVICE

BACKGROUND OF THE INVENTION

This application relates to a panic stoplight system for automobiles or similar vehicles, and to a fluid pressure switching device for use in such systems.

Conventional automobiles and similar vehicles include rear lights which are turned on when the vehicle brakes are applied to warn the operator of a following vehicle that the forward vehicle is decelerating. During daylight operation, the rear lights are simply turned on when the brakes are applied. During nighttime operation, the rear lights usually increase in intensity when the brakes are applied. A warning system of this type gives no indication as to how rapidly a vehicle is decelerating. The brake lights are on with the same intensity anytime the brakes are applied, regardless of the magnitude of the braking force.

Many systems have been proposed for providing different signals related to the deceleration rate of the vehicle. One proposed system includes inertia switching devices responsive to changes in vehicle momentum for turning the warning lights on. These systems do not warn a following operator of certain emergency conditions such as icy pavement. An operator of a vehicle may see an emergency condition ahead and forcefully apply the brakes. If the pavement is icy, the vehicle will simply continue with little change in momentum. With an inertia-type of switching device, the operator of a following vehicle will be unaware of the attempted panic braking of the forward vehicle.

Other proposed systems include a plurality of different lights of different colors. Each light is related to a certain operating mode of the vehicle. For example, a green light may indicate that a vehicle is traveling along normally; a yellow light that the vehicle is decelerating slowly; and a red light that the vehicle is decelerating rapidly. Systems of this type are very expensive because they require a plurality of switching devices and lights. In addition, an operator of a following vehicle may have his eyes off the forward vehicle momentarily and not see a light change from yellow to red. Upon seeing the red light, it will take the operator of a following vehicle at least a split second longer to react and this could be too late to prevent an accident.

Other systems of the type described include complicated switching arrangements for flashing the rear lights at various rates and intensities proportional to the deceleration rate. A system of this type is highly effective only if the operator of a following vehicle always has his eyes on the forward vehicle so that changes in the flashing rate will be readily apparent. An operator who momentarily looks in his rearview mirror or on some other scene and then notices the forward vehicle lights blinking will not be readily aware of whether the blinking rate is representative of normal or panic deceleration.

In all prior systems of the type described, the warning signal goes off as soon as panic braking ceases. This has the disadvantage that if a vehicle operator applies the brakes in a manner representative of panic braking for only a second or two, and the following operator momentarily has his eyes off the forward vehicle, he will not be aware that the forward vehicle has rapidly decelerated. Systems having a plurality of different lights or lights which blink at different rates depending upon the deceleration rate can also create confusion and pose a serious distraction under crowded multi-lane traffic because an operator would see many different lights blinking at many different rates.

SUMMARY OF THE INVENTION

In accordance with the present invention, a panic stoplight system for automobiles or like vehicles operates in response to a predetermined force applied to the actuator for the braking system to warn an operator of a following vehicle that rapid deceleration is taking place.

The system of the present invention also includes a time delay means for maintaining the warning system operative for a predetermined time after the braking force has been released, or when the brakes are being pumped.

In accordance with one arrangement, the panic stoplight system of the present invention includes a fluid pressure switching device having a fluid accumulator chamber which includes a normally open bleed orifice for relieving pressure therefrom at a predetermined rate. Fluid supply means is provided for supplying fluid to the accumulator chamber at variable rates for pressurizing the chamber at a rate proportional to the force applied to the actuator of the braking system. Movable switch operating means is responsive to a predetermined pressure in the accumulator chamber for operating a switch. The switch operating means may take many forms, including a deformable diaphragm, a movable piston or a bellows.

In one arrangement, orifice adjustment means is provided for adjusting the size of the bleed orifice in the accumulator chamber for varying the delay time after the braking force has been released.

In accordance with one aspect of the invention, the fluid supply means includes a fluid supply chamber communicating with the accumulator chamber. Volume reducing means is provided for reducing the volume of the fluid supply chamber to force fluid therefrom into the accumulator chamber. The volume reducing means may be in the form of a movable piston or the fluid supply chamber may have deformable walls.

In one arrangement, the fluid supply chamber is connected for operation by the brake actuator of the vehicle braking system. With this arrangement, the accumulator chamber is pressurized at a rate proportional to the force applied to the braking system actuator.

In one arrangement, the fluid pressure switching device includes a normally open switch connected with flasher signal lights for signaling a panic braking condition. The normally open switch is closed when the accumulator chamber is pressurized to a predetermined pressure which is proportional to a force applied to the braking system actuator representing a panic braking condition.

It is a principal object of the present invention to provide an improved panic stoplight system for automobiles and similar vehicles.

A further object of the invention is to provide an improved fluid pressure switching device for use in such a system.

An additional object of the invention is to provide a panic stoplight system with a delay means for maintaining the system operative for a predetermined time after the braking force has been relieved or reduced.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

DESCRIPTION OF THE PREFERRED EMBODIMENTS

Figure 1:
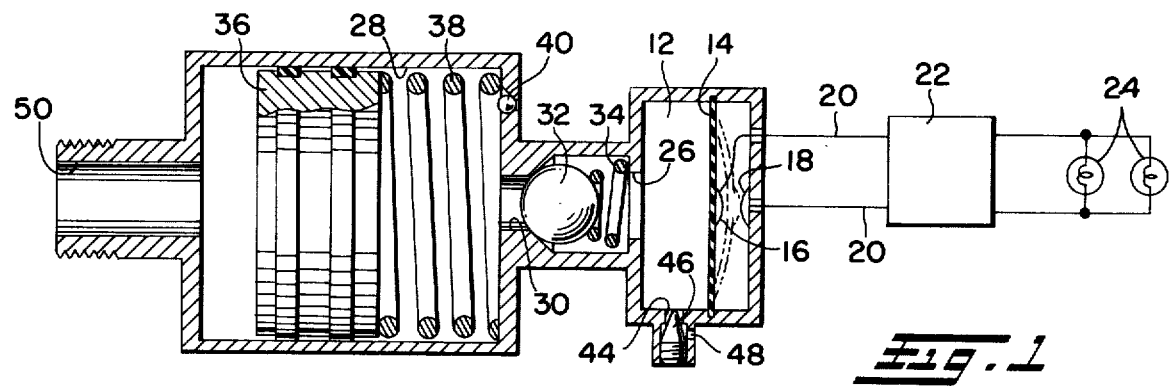
FIG. 1 is a cross-sectional elevational view showing a fluid pressure switching device constructed in accordance with the present invention connected through a flasher unit with lights.

FIG. 1 shows a fluid accumulator chamber 12 having a flexible diaphragm 14 of rubber or like material extending thereacross and carrying a switch contact 16 for cooperation with a fixed switch contact 18. Contacts 16 and 18 are connected by leads 20 through a flasher unit or switch 22 with lights 24 positioned on the rear of a vehicle. The housing in which diaphragm 14 is mounted is open to atmosphere on the side thereof carrying contact 16 for allowing expansion and contraction or flexing of diaphragm 14. Such an opening may be provided by enlarging the opening through which lead 20 extends to contact 16.

Accumulator chamber 12 has a fluid inlet 26 through which pressurized fluid, preferably air, is supplied from a fluid supply chamber 28 having an outlet conduit or opening 30 normally closed by a ball check valve which includes a ball 32 and spring 34. Fluid supply chamber 28 has a movable piston 36 mounted therein and normally biased to the left in FIG. 1 away from ball check 32 by a coil spring 38. A ball check valve 40 or the like allows ingress of air to fluid supply chamber 28.

Fluid accumulator chamber 12 includes a normally open bleed orifice 44 communicating past a needle valve 46 with an outlet 48 leading to atmosphere or the like. Needle valve 46 is adapted to be adjusted for varying the size of outlet orifice 44.

Figure 4:
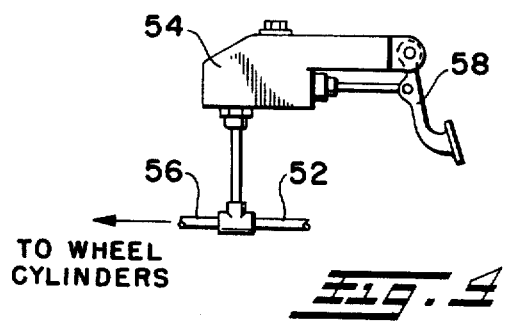
FIG. 4 is an elevational view of an actuator for a vehicle braking system.

Fluid supply chamber 28 has an inlet 50 communicating therewith on the opposite side of piston 36 from coil spring 38 and is adapted to be connected with hydraulic or pneumatic conduit 52 shown in FIG. 4 connected with hydraulic or pneumatic reservoir 54 from which fluid pressure is supplied to conduit 52 and conduit 56 leading to brakes on a vehicle braking system. Pressure is supplied from reservoir 54 by manual operation of a movable brake actuator pedal or the like 58.

Application of manual force to brake actuator 58 results in application of fluid pressure from conduit 52 through inlet 50 on one side of piston 36 in fluid supply chamber 28 for shifting piston 36 to the right in FIG. 1 against the biasing force of spring 38. This reduces the volume of fluid supply chamber 28 so that air flows therefrom through outlet 30 past the check valve 32 into accumulator chamber 12. The biasing force of spring 38 and the opening pressure for the ball check valve, along with the size of bleed orifice 44, are proportioned so that the pressure in accumulator chamber 12 is not raised to a sufficient level for deforming or flexing diaphragm 14 far enough to cause contact 16 to engage contact 18 during application of normal force to brake actuator 58 representative of normal deceleration rates for the vehicle. However, rapid application of high force to brake actuator 58 representative of panic braking or an extremely rapid deceleration rate will rapidly cause movement of piston 36 for quickly pressurizing accumulator chamber 12 a sufficient amount for deforming or flexing diaphragm 14 so that contact 16 engages contact 18 causing lights 24 to blink on and off. Even after the force on brake actuator 58 is released, accumulator chamber 12 will remain pressurized causing lights 24 to flash for a predetermined time because of the controlled rate at which fluid is permitted to escape from accumulator chamber 12 in accordance with the setting of the size of bleed orifice 44. Once sufficient pressure is bled from accumulator chamber 12, diaphragm 14 moves back to the solid line position shown in FIG. 1 to open contacts 16 and 18. The described system is operative to flash lights 24 even though the vehicle is not decelerating as when the driver attempts panic braking on a slippery surface takes place.

Figure 2:
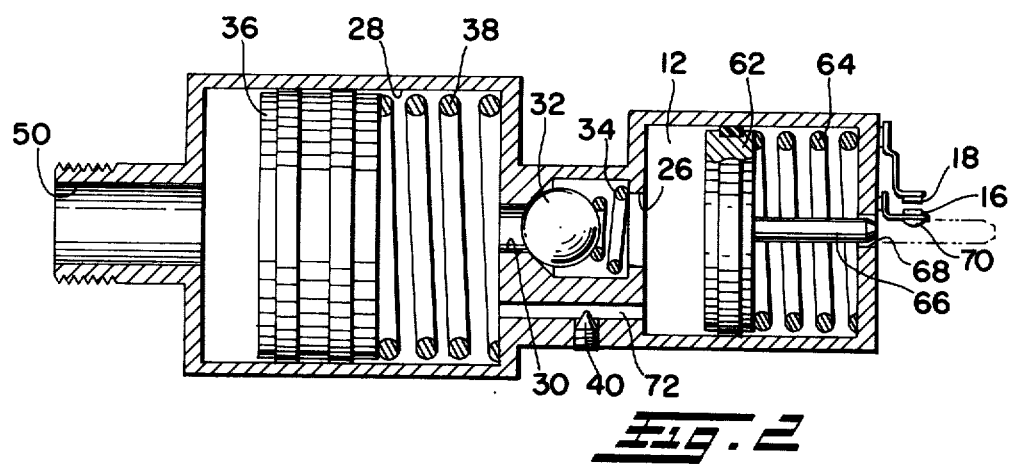
FIG. 2 is a cross-sectional elevational view showing another embodiment of a fluid pressure switching device.

FIG. 2 shows another arrangement wherein accumulator chamber 12 contains a movable piston 62 normally biased to the left by coil spring 64. A centrally located rod 66 extends from the piston 62 through a suitable hole 68 in the housing for accumulator chamber 12 to act against insulator 70 for closing contacts 16 and 18 when the rod is moved to the shadow line position. In this embodiment, bleed orifice 72 simply provides communication between accumulator chamber 12 and fluid supply chamber 28 for bleeding fluid from accumulator chamber 12 at a predetermined rate for maintaining the lights in a blinking condition for a predetermined time after the panic braking force has been released from the braking actuator 58. The arrangement of FIG. 2 is a closed system facilitating use of hydraulic fluid in accumulator chamber 12 and supply chamber 28.

Figure 3:
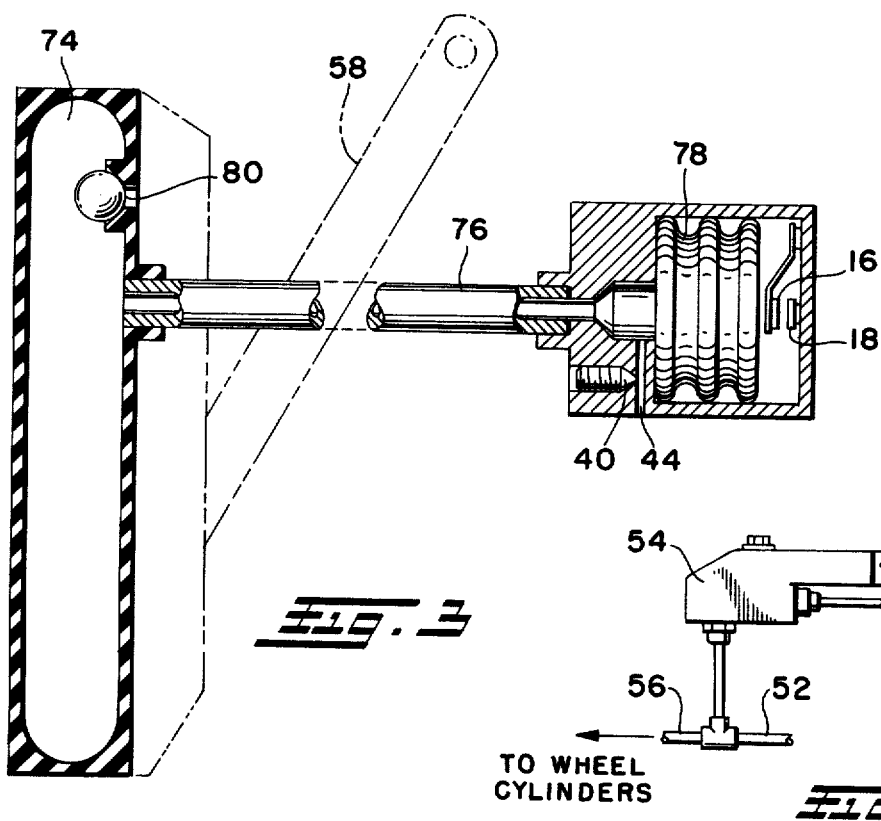
FIG. 3 is a cross-sectional elevational view showing another embodiment of a fluid pressure switching arrangement.

FIG. 3 shows still another arrangement wherein a fluid supply chamber 74 has deformable walls of elastomeric material and brake actuator 58 includes deforming means for deforming the walls of chamber 74 to reduce the volume thereof for forcing fluid therefrom through conduit 76 into a bellows 78 defining the accumulator chamber. Bellows 78 may simply operate against a spring arm carrying contact 16 for moving it into engagement with fixed contact 18. Bleed orifice 44 communicates with the interior of bellows 78 for bleeding pressure therefrom at a predetermined rate. Fluid supply chamber 74 includes an inlet check valve 80 for allowing expansion of fluid supply chamber 74 when the manual force is released from actuator 58.

Although the invention has been shown and described with reference to certain preferred embodiments, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A fluid pressure switching device in combination with a vehicle braking system for indicating panic braking, comprising: a fluid accumulator chamber, fluid supply means for supplying fluid to said accumulator chamber at variable rates for pressurizing said accumulator chamber, said fluid supply means including a fluid supply chamber communicating through a supply conduct with said accumulator chamber and volume reducing means for reducing the volume of said fluid supply chamber to force fluid therefrom into said accumulator chamber, a flow control check valve means in said supply conduit for preventing flow of fluid from said accumulator chamber to said fluid supply chamber, said vehicle braking system including a manually operated brake actuator and fluid conduit means through which pressure is applied by said brake actuator for applying the vehicle brakes, said brake actuator also being coupled via said fluid conduit means to supply pressure to said volume reducing means for operation of the latter in response to pressure in said fluid conduit means to reduce the volume of said fluid supply chamber for pressurizing said accumulator chamber at a rate proportional to the force applied to said brake actuator, a switch connected with signal lights of the vehicle, movable switch operating means responsive to a predetermined pressure in said accumulator chamber for operating said switch, a normally open bleed orifice in fluid communication with said accumulator chamber for passing fluid from the latter to relieve pressure therein at a predetermined rate, said orifice being of a size to preclude pressurization of said accumulator chamber in excess of such predetermined pressure when said fluid supply means supplies fluid to said accumulator chamber at or below such predetermined rate and to permit temporarily pressurization of said accumulator chamber in excess of such predetermined pressure when said fluid supply means supplies fluid to said accumulator chamber above such predetermined rate to effect movement of said switch operating means to operate said switch, the relationship of the size of said bleed orifice, the predetermined pressure at which said switch operating means operates said switch, and the fluid pressures in said fluid conduit means in response to operation of said brake actuator being such that said switch operating means is operative to operate said switch when said brake actuator has been operated for panic braking.

2. The device of claim 1, said accumulator chamber being a pneumatic accumulator chamber, and said fluid supply chamber being a pneumatic supply chamber.

3. The device of claim 2, said switch being a normally open switch connected with said signal lights through a flasher switch.

* * * * *